United States Patent [19]

Kinzenbaw

[11] 4,207,950

[45] Jun. 17, 1980

[54] AGRICULTURAL ROW MARKER

[76] Inventor: Jon E. Kinzenbaw, P.O. Box 525, Wiliamsburg, Iowa 52361

[21] Appl. No.: 900,498

[22] Filed: Apr. 27, 1978

[51] Int. Cl.² .................................................. A01B 17/00
[52] U.S. Cl. ...................................... 172/126; 172/456
[58] Field of Search ............... 172/126, 127, 128, 129, 172/130, 311, 456

[56] References Cited

U.S. PATENT DOCUMENTS

| | | | |
|---|---|---|---|
| 3,072,200 | 1/1963 | Yerkes | 172/126 |
| 3,520,373 | 7/1970 | Stinemetz | 172/130 |
| 3,666,019 | 5/1972 | Yeske | 172/130 |
| 3,669,195 | 6/1972 | Green | 172/126 |
| 3,747,148 | 7/1973 | Hitchcock | 172/126 |
| 3,766,987 | 10/1973 | Orthman | 172/126 |
| 3,799,272 | 3/1974 | Watson | 172/126 |

OTHER PUBLICATIONS

Brillion 30′ Pulir-Mulcher, Brillion Iron Works, Brillion Wisc.

*Primary Examiner*—Richard J. Johnson
*Attorney, Agent, or Firm*—Emrich, Root, Lee, Brown & Hill

[57] ABSTRACT

A marking element is carried by at least one arm which is pivotally mounted to a short boom. The boom, in turn, is pivotally mounted to the outboard end of a tool bar or planter frame. A single hydraulic ram is used to move the marker between a use position in which the arm extends horizontally so the marker engages the ground, and an upright position in which the arm is folded over the tool bar.

10 Claims, 13 Drawing Figures

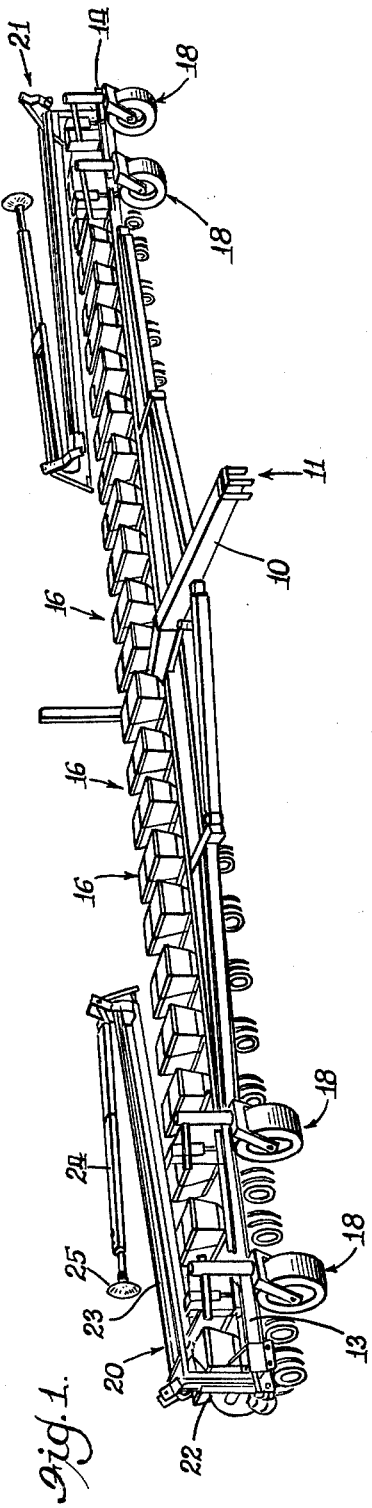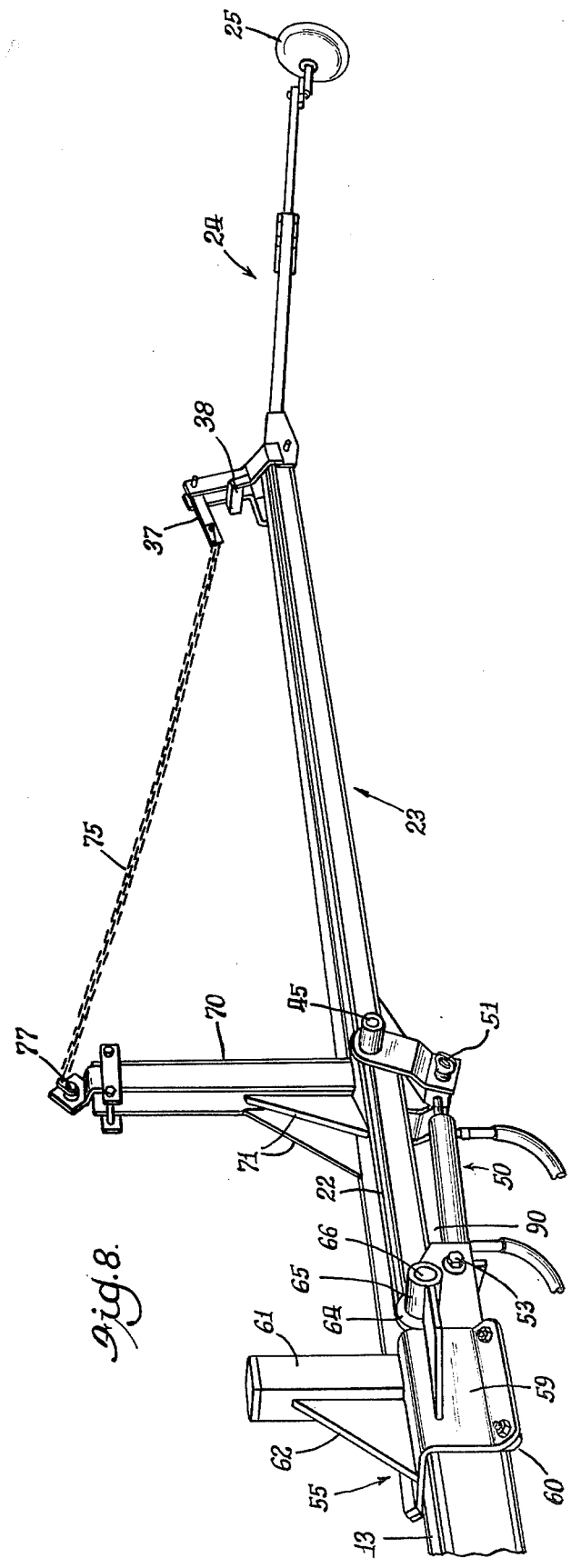

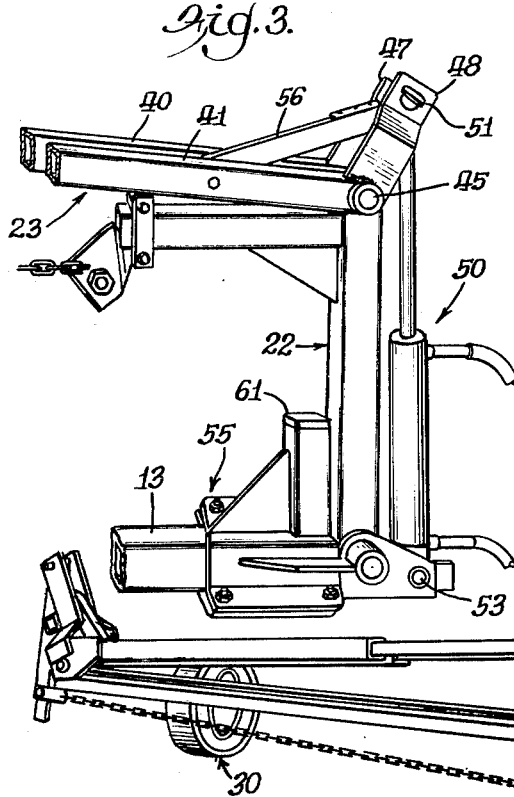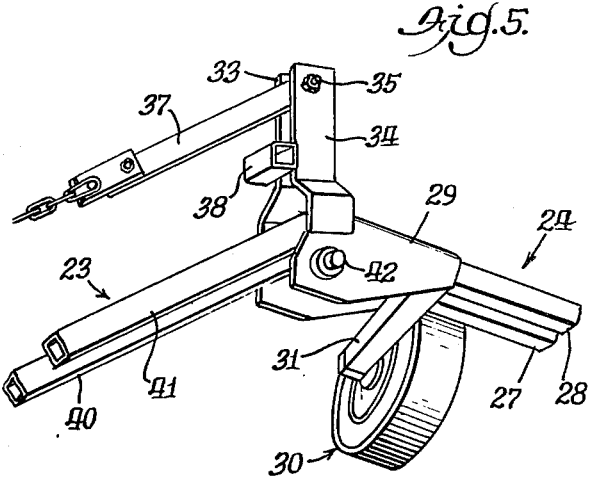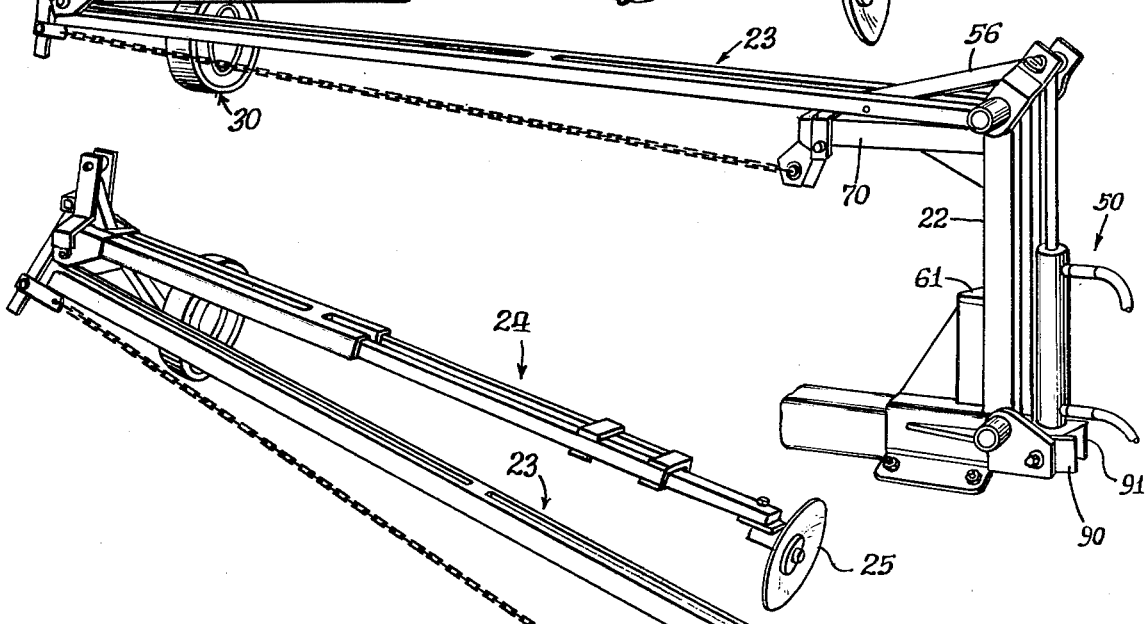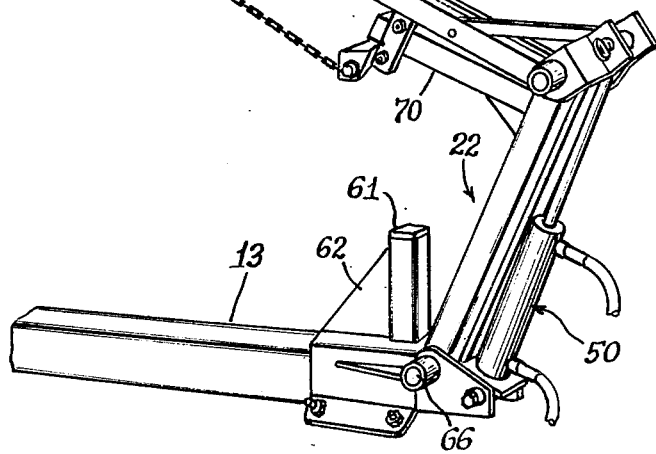

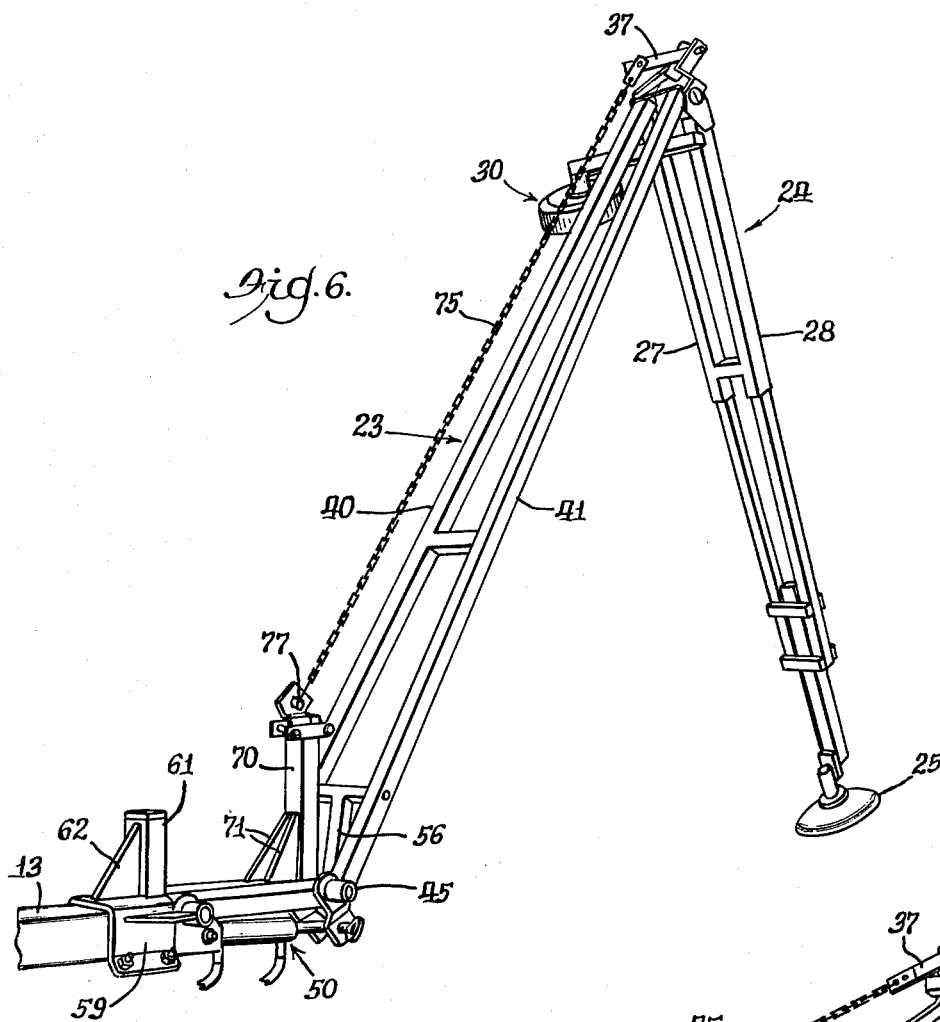
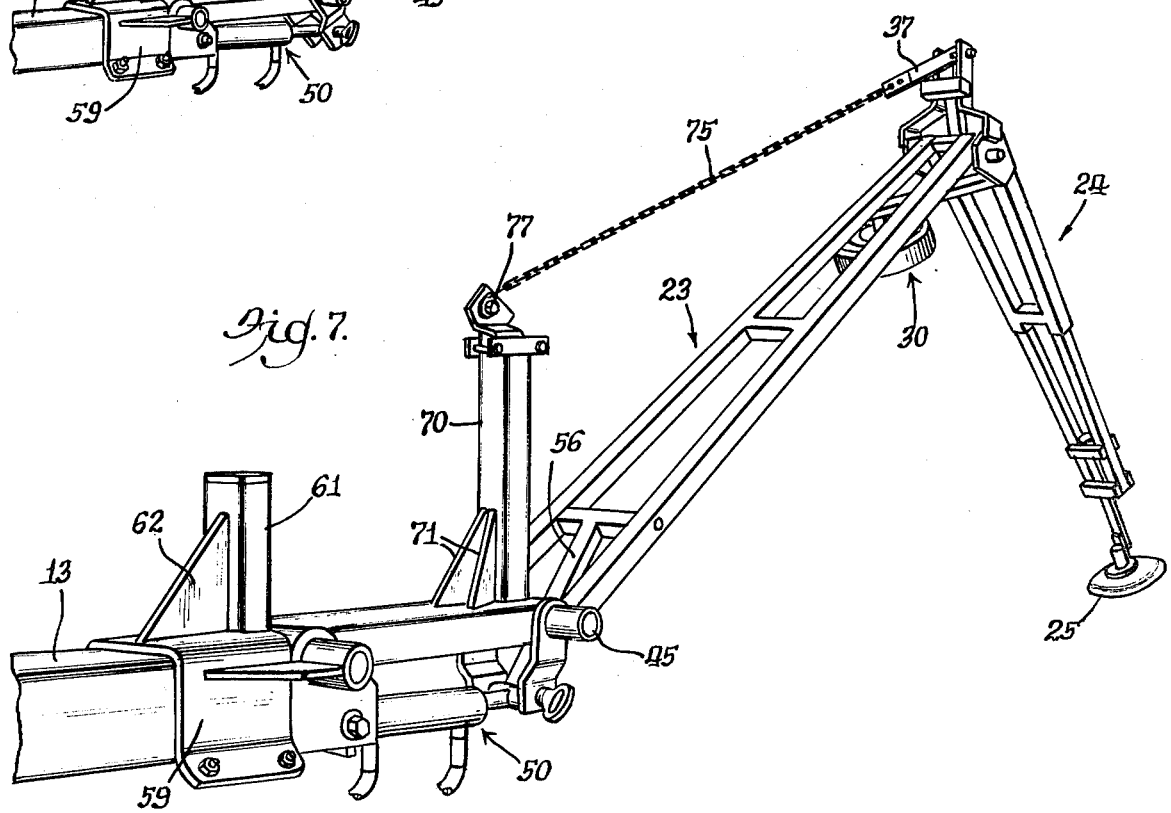

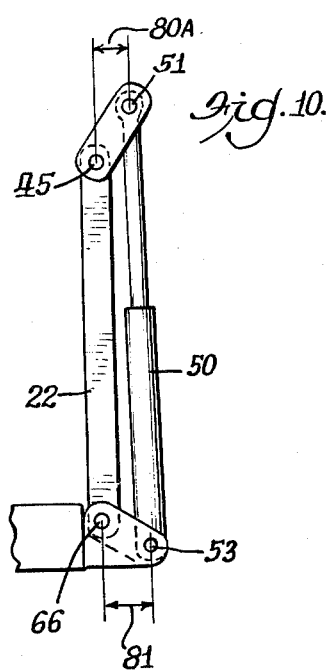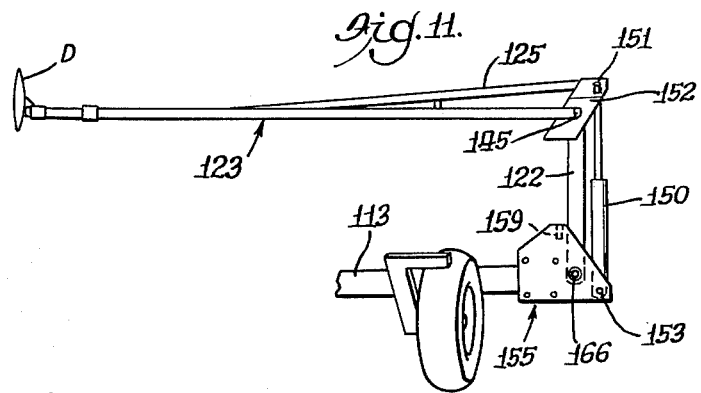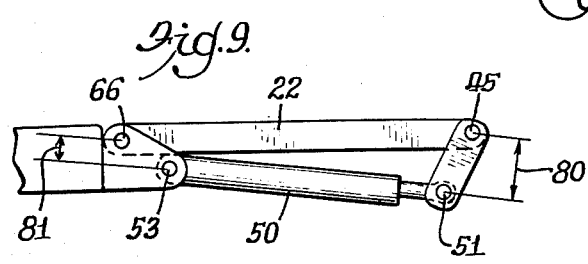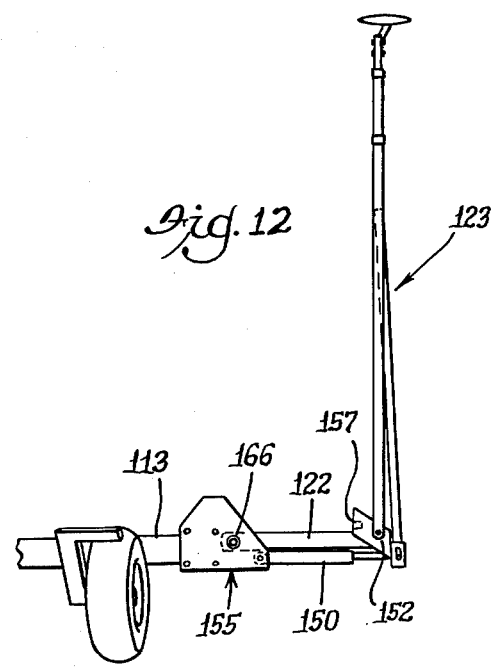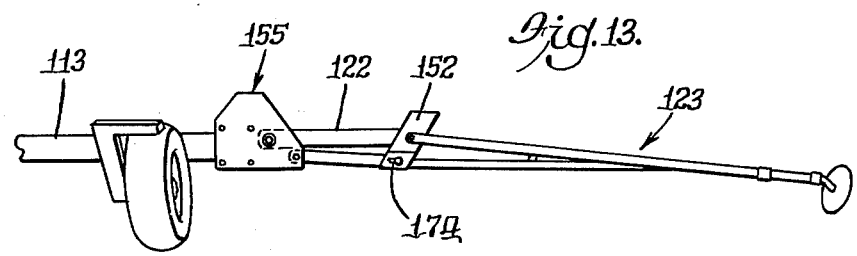

AGRICULTURAL ROW MARKER

BACKGROUND AND SUMMARY

The present invention relates to an agricultural row marker. A row marker is typically used with a planter system to indicate to a farmer where his tractor should be traveling relative to planted rows so that the rows being planted during one pass of the planter will be properly spaced from those already planted on a previous pass.

Planter systems include a number of individual planting units which are mounted on a cross frame. The frame may either be of a pull type (in which most of the weight of the frame and units is separately borne by support wheels), or of a tool bar type (in which the frame and units are connected to a conventional three-point hitch for raising and lowering the planter system). The present invention applies to both structures, and the term "planter frame" is therefore intended to include both.

There has been a recent trend to larger and larger planters--that is, whereas previously, commercially available planters were limited to twelve-row widths, larger tractors and larger farms have made it desirable to use planters of even greater width. A folding planter frame disclosed in my copending application Ser. No. 644,547, filed Dec. 29, 1975, now abandoned, entitled "Agricultural Tool Bar", makes it possible to plant as many as 25 rows simultaneously, with a three-foot spacing between rows. It will thus be appreciated that the complete planter frame, when unfolded to the use position, may extend for a length of 35-80 feet. When a farmer makes one pass with such a planter, the outermost units will be planting rows approximately 40 feet from his position. On the next pass, he will be sitting 80 feet to that side (that is, in the middle of the next pass), and this makes it desirable that the marker be located a full planter width from his position at the seat of the tractor (that is, one-half of the planter width for the pass presently being planted, and another half of the planter width for the pass to be planted). In other words, the marker should have a length, in the use position, equal to one-half of the width of the planter frame when it is extended (i.e. the distance from the center line of the tractor to the outermost planting unit).

In the past, one form of marker included two arms pivotally joined together and having a marker element on the outboard end of one of the arms, with the inboard end of the other arm pivotally connected to the end of a planter frame. Ordinarily, a planter has separate markers on its right and left sides. In these markers, in the folded position, the two arms extend upwardly. With the trend toward larger planters, the height of such systems, added to the height of a planter frame, makes it prohibitive. Systems have been suggested for rotating the folded marker arms over the planter frame sideways, but the only commercial system for doing so of which I am aware requires two separate hydraulic rams for complete operation.

One of the principal functions of this invention is to provide a marker capable of extending up to 40 feet or farther to the side of a planter frame in the use position, yet extending a height of less than about 12 feet in the folded or road travel position, wherein complete operation is effected through the use of a single hydraulic cylinder and piston rod unit (or simply "hydraulic ram").

In the larger system disclosed, a pair of folding arms carry a marking element; and the inner arm is pivotally mounted to a short boom which, in turn, is pivotally mounted to the outboard end of a planter frame and adapted to be moved between a horizontal use position and upright storage or road travel position. A single hydraulic ram is connected between the planter frame and the intermediate arm to fold and unfold the marker.

To fold the marker for road travel, the ram is actuated in a first direction; and during a first portion of the ram's movement, the arms fold by cranking the intermediate arm about its pivotal connection to the short boom. After the intermediate arm has reached an upright position, further ram action continues, and this further action folds the boom from its horizontal position to its upright position to place the folded intermediate and outer arms over the planter frame.

To unfold the marker for use, the ram is actuated in the reverse direction. During the first portion of the unfold cycle, the short boom is rotated to its horizontal position. As the reverse ram action continues, after the short boom is lowered, the arms are unfolded to the horizontal position for use.

Because of the length of the marker, a support wheel may be provided, preferably at the juncture between the intermediate and outer arms. Further, stops are provided at a number of locations. A first stop limits the folding rotation of the intermediate arm relative to the short boom. Additional stops are provided for the two limit positions of the short boom.

A smaller version is also disclosed using only a single arm, for smaller planters.

Other features and advantages of the present invention will be apparent to persons skilled in the art from the following detailed description of a preferred embodiment wherein identical reference numerals will refer to like parts in the various views.

THE DRAWING

FIG. 1 is an upper perspective view, taken from the front and side of a folding planter equipped with markers constructed according to the present invention, the markers being shown in the folded position;

FIG. 2 is a perspective view of the right side marker shown in the folded position, with the planter frame broken away, taken from the rear and slightly to the side and above the planter frame;

FIG. 3 is a close-up perspective view of the right side marker shown in the position of FIG. 2, with both the planter frame and intermediate arm broken away, and taken slightly to the left of the short boom;

FIG. 4 is a view similar to FIG. 2 illustrating the marker as it begins to be moved from the storage position to the use position or just as it is completing a cycle of movement from the use position to the storage position;

FIG. 5 is a close-up lower rear perspective view showing the intermediate and outer arms of the marker slightly folded, with both arms broken away;

FIGS. 6 and 7 are rear perspective views of the marker system, with the planter frame partly broken away, in various stages of folding or unfolding;

FIG. 8 is a view similar to FIGS. 6 and 7 with the right side marker completely unfolded and following the contour of the ground;

FIGS. 9 and 10 are fragmentary side views showing the various pivot points of the actuating mechanism in the vertical and horizontal positions respectively, and illustrating the sequence of operations;

FIG. 11 is a fragmentary rear view of a smaller version of the marker in the folded position;

FIG. 12 is a view similar to FIG. 11 with the marker partially unfolded; and

FIG. 13 is a view similar to FIG. 11 with the marker fully unfolded in the use position.

DETAILED DESCRIPTION

Referring to FIG. 1, there is seen a complete planter including a draft member 10 adapted to connect to a conventional tractor hitch at 11. The illustrated planter is a large one, and so it is of the pull-type frame as distinguished from a tool bar frame. However, as indicated above, the present invention is adaptable to any type of planter.

The planter includes first and second side frame members 13, 14, in the form of elongated beams on which the individual planter units 16 are mounted. The weight of the frames and planter units is carried by support wheels 18.

First and second markers, generally designated 20 and 21 are connected respectively to the right and left outboard ends of the beams 13, 14, from the viewpoint of an occupant of the tractor.

The right and left markers are similar in structure and operation, and only one need be further described for a complete understanding of the invention. Referring then to the right marker (on the left side of FIG. 1), it includes a short beam 22, or boom, as it is sometimes called; an intermediate arm 23 and an outer arm 24. A disc-shaped marker element 25 is conventionally mounted to the distal end of the outer arm 24. As seen in better detail in FIGS. 2, 5 and 8, the end of the outer arm 24 includes a pair of converging beams 27, 28 which are welded to a bracket 29. A support wheel 30 is attached to the bracket 29 by means of member 31.

A pair of brackets 33, 34 are welded to the bracket 29, and extend upwardly therefrom to form a crank. At the top of the crank, a bolt or pin 35 is located; and a link 37 is connected to it. A stop member 38 is located on the inboard end of the crank to prevent interference between the link 37 and the intermediate arm 23 which, as best seen in FIG. 5 is also formed from a pair of converging tubular beams 40, 41. A pin 42 is also provided in the bracket 29 for pivotally mounting the intermediate arm 23 and outer arm 24 together.

Referring now to FIGS. 2 and 3, the inner end of the intermediate arm 23 is pivotally connected to the short beam 22 by means of a pin 45. A pair of brackets 47, 48 are welded respectively to the individual beams 40, 41 comprising the intermediate arm 23; and they form a crank to which the rod end of a hydraulic ram 50 is attached by means of the pin 51. The pin 51 may be received in a slot, the function of which will be discussed in connection with the second embodiment. The cylinder end of the double-acting hydraulic ram 50 is pivotally attached at 53 to a mount, generally designated 55 which secures the marker to the main beam 13 of the planter frame. The crank formed by the brackets 47, 48 is braced against the intermediate arm by a member 56.

As best seen in FIGS. 3 and 8, the mount for the marker includes a clamp comprised of a pair of flanged angle members 59, 60 which are bolted together and secured to the outboard end of the beam 13. Extending upwardly of the member 59 is a stop member 61 which is braced as at 62. The member 61 forms a stop for the rotation of the short beam, as will be more fully described below. The uppermost position of the short beam 22 is seen in FIG. 2.

Extending outwardly of the clamp mount are a pair of plates, one of which is seen in FIG. 8 and designated 64. A sleeve 65 is welded to the plate 64, and a similar arrangement is located on the other side of the short beam 22 for pivotally mounting the short beam 22 by means of a pin 66 to the mount 55.

At the outboard end of the short beam 22, an upright beam section 70 is welded, braced by members 71. Still referring to FIG. 8, a chain 75 is connected at 77 to the top of the beam section 70 at one end, and it is connected to the link 37 at the other end.

Referring now to FIG. 2, a pair of blocks 90, 91 are welded to the plates which hold the short beam and ram; and these act to engage the underside of the short beam in the lowered position, and limit its rotation as seen in FIG. 8.

Before discussing the operation of the raising and lowering of the marker, reference is made to FIGS. 9 and 10 wherein the principal elements of the mechanism including pivot points 45, 51, 53 and 66 is reproduced. To review, pivot point 45 represents the axis of rotation of the intermediate arm 23 about the distal end of the short beam 22. Pivot points 53 and 51 represent respectively the pivot axes of the inboard and outboard connections of the hydraulic ram 50. In raising the marker to the storage position shown in FIG. 2 from the use position of FIG. 8, the hydraulic ram is extended, and it may be thought of as applying equal and opposing forces in FIG. 9, along its axis to the pivot points 51 and 53. The perpendicular distance between the axis of the ram and the pivot point 45 is represented by an arrow 80; and it is seen to be greater than the corresponding perpendicular distance between the axis of the ram and pivot point 66, as represented by arrow 81 in FIG. 9. Thus, the torque about the pivot point 45 is greater than the torque about the pivot point 66. When the ram is extended, the marker arm 23 will rotate counterclockwise as seen in FIG. 8 to the positions shown in FIGS. 7 and 6 respectively. The length of the chain 75 is such that as the intermediate arm 23 is raised, the outer arm 24 is permitted to fold. Further, the connection 77 of the inboard end of the chain 75 is elevated relative to the pivot axis 45 so that as the intermediate arm 23 raises, the distance between the connection 77 and the link 37 reduces, thereby permitting the outer arm 24 to fold.

As the ram 50 continues to extend beyond the position of FIG. 6, the T-shaped link 56 will engage the beam section 70 which is mounted to the short beam 22. The section 70 thus limits rotation of the intermediate arm 23 relative to the short beam 22; and continued extension of the ram 50 will cause the short beam 22 to rotate counterclockwise, as best seen in FIG. 4. During this portion of the folding cycle, the link 37 will engage the stop element 38 (refer to FIG. 5), and this will limit the rotation of the outer arm 24 relative to the intermediate arm 23, so that the marker element 25 does not engage the intermediate arm, as seen in FIGS. 2 and 4. As the ram continues to extend, the short beam 22 will be raised to the position of FIG. 2 where it will abut the stop member 61, thereby preventing further rotation. This is the "folded", "road travel", or storage position seen in FIGS. 2 and 1.

In the road travel position, it will be observed from FIG. 10 that the hydraulic ram will have moved the pivot point 51 above the pivot point 45 so that the outer end of the rod is more toward an "over center" position, and the perpendicular distance 80A between the axis of the ram and the axis of pivot 45 is now less than the corresponding distance 81A between the axis of the ram and the pivot axis 66. Thus, when the action of the ram is reversed for the unfolding cycle, the greater torque is about pivot point 66 so that the short beam 22 is first rotated clockwise to the position of FIG. 4 before the intermediate and outer arms begin to unfold; and it reaches the position of FIG. 6 before the articulated arm begins to unfold. Thus, the unfolding cycle is the reverse of the actions that took place in the folding cycle. This reversal of action is considered important—that is, that the marker arm means folds before the short beam rotates in the folding cycle, and that it unfolds after the short beam has rotated in the unfolding cycle. It is considered advantageous in that interference with overhanging objects is minimized. Further, the folding and unfolding operations are smooth, and the cycles repeat themselves smoothly. With this sequence of operations, the marker will not "snap" or fall rapidly to the open position once the center of gravity of the marker arm passes over the pivot axis 51.

Referring now to FIGS. 11–13, the invention is adapted to a shorter marker having only a single arm, generally designated 123, the marker again being in the form of a disc D mounted to the distal end of the arm 123. The arm 123 includes bracing as at 125, as needed.

In FIGS. 11–13, the beam of the planter is designated 113, and only seen in fragmentary form since that is all that is necessary to understand this embodiment. The marker is mounted to the distal end of the beam 113 by means of a mount generally designated 155, comprising a pair of spaced plates, one on either side of the beam 113 to provide mountings for pivots 166 and 153. A hydraulic cylinder and piston rod unit is designated 150, and its rod end is pivotally mounted at 151 to a base member 152 which is an integral part of the arm 123. A short beam is designated 122, and has one end pivotally mounted at 166 to the mount 155, and is pivotally mounted at 145 to the rigid base member 152.

Referring now to FIG. 13, the pin 151 which is secured to the rod end of the cylinder unit 150 is mounted in a slot 174 which is formed in the base member 152. This has the advantage of permitting the arm 123 and marker to follow the contour of the ground more readily. There is some "play" in the structure itself because the four pivot points 45, 51, 53 and 66 form a four-sided polygon which is not truly rigid because of the pivotal connections. The play is even further enhanced by means of the slot 174, and it does not interfere with the folding and unfolding cycles of the marker. The folding sequence is shown in FIGS. 13, 12 and 11 respectively. As the ram 150 extends, the arm 123 is first folded, with the short beam 122 remaining in a generally horizontal position (FIG. 12). When the arm 123 reaches a generally upright position, a stop member 157 connected to the base 152 engages the top of the short beam 122, thereby preventing further rotation of the arm 123. As the ram continues to extend, the short beam 122 is rotated counterclockwise above the axis of pivot 166. When the arm 123 reaches the position of FIG. 11, where it is folded over the beam 113, the short beam 122 engages a stop member 159 welded between the plates forming the mount 155. This is the folded position.

In unfolding, because the relationship of the pivot points 145, 151, 153 and 166 is similar to that disclosed in connection with FIGS. 9 and 10 (the numerals in the second embodiment being the same as those in FIGS. 9 and 10 with a "1" before them), during the unfolding sequence, first the short beam is rotated clockwise to the position of FIG. 12, and thereafter, with continued retraction of the rod on the cylinder unit 150, the arm 123 is folded counterclockwise about the pivot 145 to the use position shown in FIG. 13.

Although both embodiments show a similar arrangement of pivots using a single ram for effecting both the folding and unfolding operations, persons skilled in the art will be able to devise others, and to substitute equivalent elements for those shown, while continuing to practice the principle of the invention; and it is, therefore, intended that all such modifications and substitutions be covered as they are embraced within the spirit and scope of the appended claims.

I claim:

1. A row marker for an agricultural implement including a frame comprising: a boom pivotally mounted to said frame; marker arm means carrying a marker on a distal end and pivotally mounted to the distal end of said boom at a proximal end for movement between an extended or use position and a folded or storage position; and a hydraulic ram having one end pivotally connected to said frame and the other end pivotally connected to said marker arm means; said boom, arm means and ram being constructed and arranged such that when said ram is actuated in a first direction to urge said marker to the storage position from the use position, said arm means will raise to an upright position for a first portion of movement of the ram, then said boom will be pivoted to an upright position for continued movement of said ram in said first direction, to thereby fold said arm means above said frame after said arm means has been folded relative to said boom, and when said ram is actuated in a reverse direction to move said arm means to the use position, said boom will first be rotated to the horizontal position, then said arm means will be rotated to the use position for continued movement of said ram in said reverse direction.

2. The apparatus of claim 1 further comprising first stop means mounted to said boom for engaging said arm means in the folded position to limit further rotation thereof, whereby further action of said ram in said first direction causes said boom to rotate about its pivotal connection to said frame after said arm means has engaged said first stop means.

3. The apparatus of claim 1 comprising a second stop member connected to said frame for engaging said boom in the raised position to limit further rotation thereof relative to said frame.

4. The apparatus of claim 1 further comprising rigid base means connected to the inboard end of said marker arm means, said ram having one end pivotally connected to said base means, characterized in that when said boom is in one position, the distance between the axis of said ram and the pivot axis between the boom and said arm means is greater than the distance between the axis of said ram and the pivotal connection between said frame and said boom, both of said distances being taken along lines perpendicular to the axis of said ram.

5. The apparatus of claim 4 further characterized in that when said boom is in the other position, the distance between the axis of said ram and the pivotal connection between said boom and said frame is greater than the distance between the axis of said ram and the pivotal connection between said boom and said arm means, all of said distances being taken along lines perpendicular to the axis of said ram.

6. The apparatus of claim 3 further comprising stop means for limiting the rotation of the boom in the use position.

7. The apparatus of claim 1 wherein said arm means comprises first and second arms pivotally connected together; and means for folding and unfolding said arms in the storage and use positions respectively.

8. The apparatus of claim 1 wherein the pivotal connection between said ram and said arm means includes a pin slidably received in a slot, whereby said marker may follow the contour of the ground over a wide range of elevation without damage to said ram or the pivotal connections of the system.

9. In a folding agricultural marker for use with a planter frame, said marker having an intermediate arm and an outer arm, the improvement comprising: a beam having an outboard end pivotally connected to said intermediate arm, and an inboard end; means for pivotally mounting said inboard end of said beam to said planter frame; and a single hydraulic ram having one end pivotally connected to said frame and the other end pivotally connected to said intermediate arm, the axis of said ram being generally parallel to but slightly divergent from the axis of said beam in the use position of said beam.

10. A row marker for an agricultural implement including a generally horizontal frame comprising: a boom pivotally mounted to said frame for motion between a generally horizontal use position and a storage position in which said boom is generally vertical; marker arm means carrying a marker on the distal end and pivotally mounted at its proximal end to the distal end of said boom for movement between an extended use position and a folded storage position; a stop for limiting the pivotal motion of said arm means relative to said boom in the storage position; and a hydraulic ram having one end pivotally connected to said frame and the other end pivotally connected to said marker arm means; said boom, arm means, stop and ram being constructed and arranged such that when said ram is actuated in a first direction to urge said marker to the storage position from the use position, said arm means will rotate approximately ninety degrees to an upright position for a first portion of movement of said ram until said arm means engages said stop, then said boom will be pivoted approximately ninety degrees to an upright position and said arm means will rotate an additional ninety degrees to a horizontal position above said frame as said ram continues to be actuated in said first direction, to thereby fold said arm means above said frame after said arm means has been folded relative to said boom, and when said ram is actuated in a reverse direction to move said arm means to the use position, said boom will first be rotated to the horizontal use position with said arm means engaging said stop, then said arm means will be rotated to the use position for continued movement of said ram in said reverse direction.

* * * * *